Nov. 13, 1934.  A. E. WILKOFF  1,980,963
TUNNEL LINER
Filed Dec. 2, 1933  2 Sheets-Sheet 1
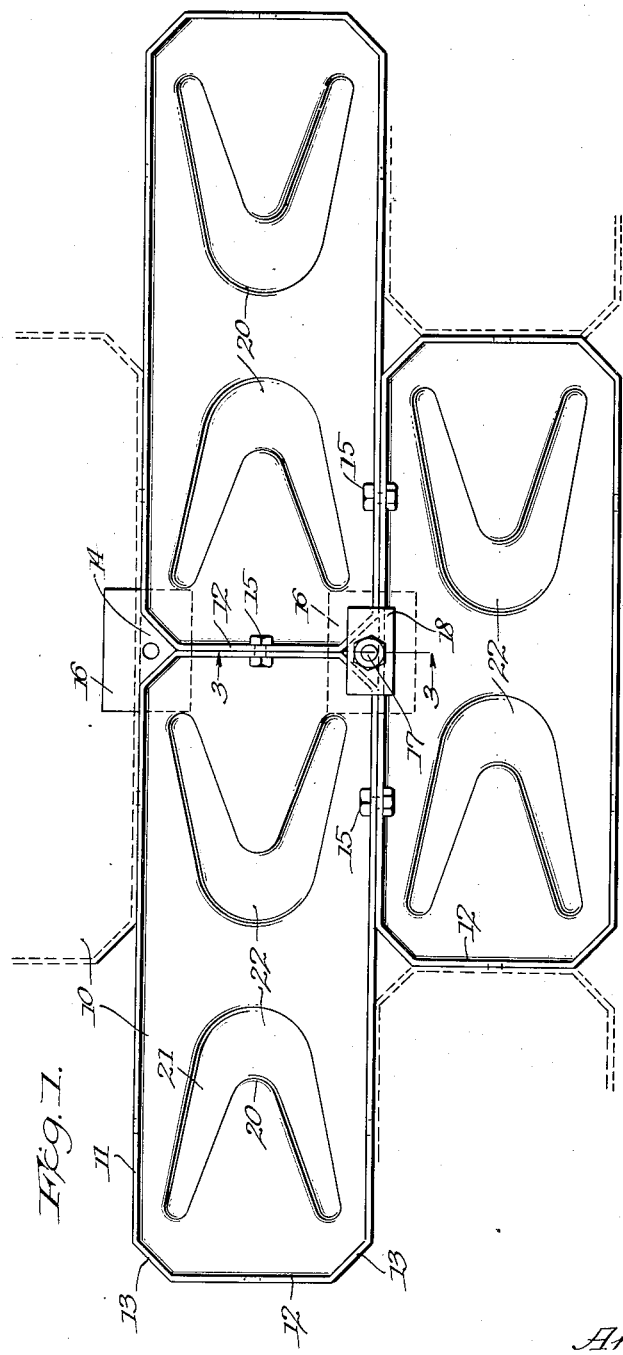
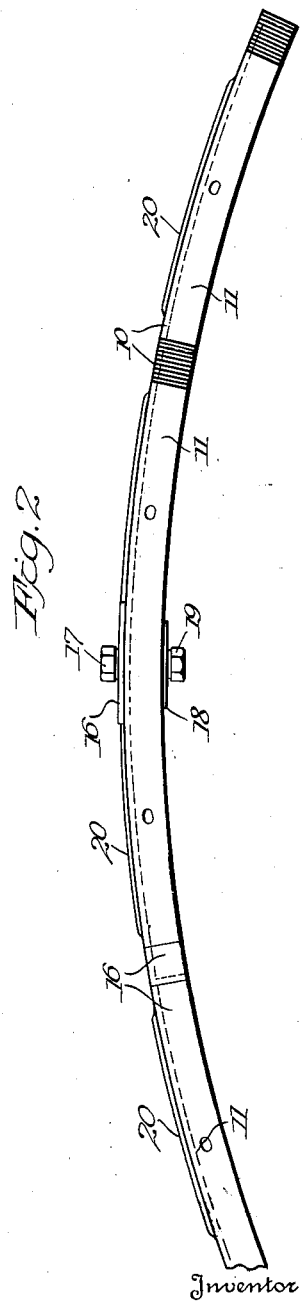
Inventor
Arthur E. Wilkoff
His Attorneys Nov. 13, 1934.  A. E. WILKOFF  1,980,963
TUNNEL LINER
Filed Dec. 2, 1933   2 Sheets-Sheet 2
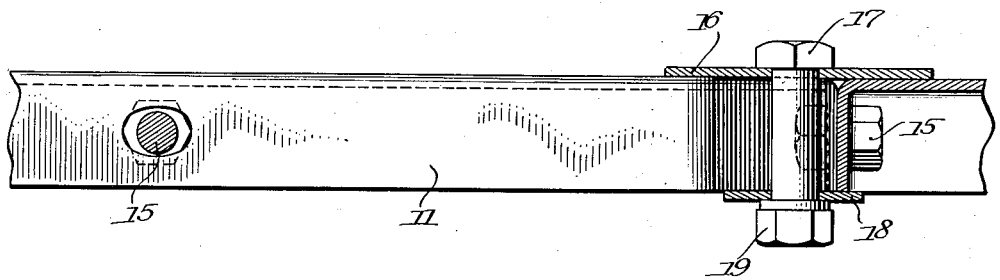
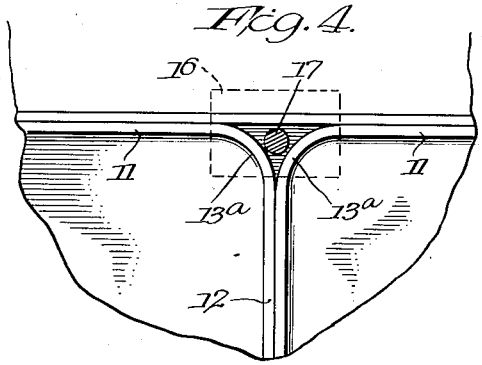
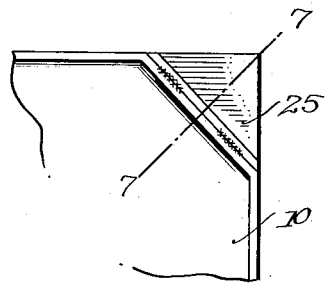
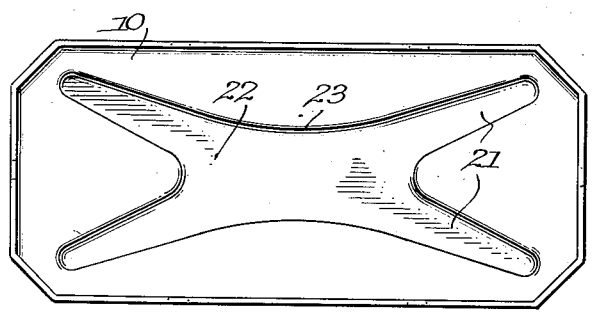
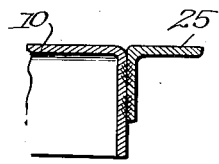
Inventor
Arthur E. Wilkoff Patented Nov. 13, 1934

1,980,963

UNITED STATES PATENT OFFICE 1,980,963

TUNNEL LINER

Arthur E. Wilkoff, Niles, Ohio, assignor to Youngstown Steel Car Corporation, a corporation Application December 2, 1933, Serial No. 700,711

6 Claims. (Cl. 61—45)

The present invention relates to tunnel liner plates used in the erection of metal lining for tunnels, mine shafts and like construction and aims generally to improve existing devices of that character.

In order that the important features of my invention may be best understood, reference may be had to the following detailed description and the accompanying drawings which are illustrative of suitable embodiments and in which Fig. 1 is a bottom plan view of a plurality of assembled liner plates;

Fig. 2 is a side view thereof;

Fig. 3 is a detail sectional view taken on the line 3—3 of Fig. 1;

Fig. 4 is a detail view of a modified corner construction of a liner plate;

Fig. 5 is a plan view of a plate showing a modified form of reinforcement;

Fig. 6 is a detail bottom plan view of a modified corner construction; and

Fig. 7 is a detail sectional view taken on the line 7—7 of Fig. 6.

According to one embodiment of my invention, a plurality of liner plates are provided each comprising a base or skin plate 10 with side and end flanges 11 and 12. The corners of the plate are preferably relieved, as by beveling them as at 13 to provide a clearance or opening 14 between adjacent plates when assembled in staggered relation as shown in Fig. 1. The bevelled corner construction also facilitates pressing the flanges from a cold flat steel blank, so that the side, corner and end flanges may be continuous, integral and of uniform construction.

A plurality of liner plates may be connected together in staggered relation as shown in Fig. 1, by bolting or otherwise securing adjoining flanges of adjacent plates as at 15, and as is customary in the art. Heretofore it has been found advisable and necessary to provide about four bolts connecting adjoining side flanges and two bolts connecting adjoining end flanges. With my invention a less number of bolt connections between the adjoining flanges gives satisfactory results, thus materially decreasing the time required for erecting the lining.

When a plurality of liner plates are assembled as in Fig. 1, there exist triangular-shaped openings 14 between corners of endwise adjacent plates and the side flange of a laterally juxtaposed plate. In order to prevent seepage of granular material, such as sand, through these openings, I provide a closure plate 16 preferably as shown in Fig. 1, adapted to lie flat upon the upper surface of the sheet adjacent the corner, and overlie and space the opening. This closure plate 16 is suitably apertured to receive a bolt 17, the shank of which passes through a clamping bar 18 and receives a nut 19, which, upon being tightened, securely clamps the adjoining corner flanges of adjacent plates between the plate 16 and clamping bar 17. This materially strengthens the assembled structure and assures an adequately strong structure with a minimum of bolt connections 15, and at the same time, provides an adequate closure against the seepage of material through the openings 14.

It is well known that tunnel liner plates of the general type referred to herein are subject, when in use, to severe compressive forces both longitudinally and transversely of the plates, which cause buckling of the plates unless the plates are reinforced against such compressive forces. Accordingly it has been proposed heretofore to corrugate the body or skin plate longitudinally to reinforce it in that direction. Similarly it has been proposed to corrugate the sheet transversely to reinforce it against transverse compressive strains, but I am not aware of any tunnel liner plate that is suitably reinforced against compressive forces both longitudinally and laterally as well as other directions, such as diagonally.

According to this feature of my invention, the body or skin plate 10 is formed or pressed so as to provide V-shaped ribs 20, the legs 21 of which extend or are disposed substantially diagonally of the plate, and the intermediate portion 22 of which is of substantial area. This may be accomplished by making the ribs separate as shown in Fig. 1, or connected as at 23 in the form of an X as shown in Fig. 5. In either case, the area of the central portion 22 is of sufficient size to reinforce the plate longitudinally, while the diagonal or oblique disposition of the legs 21 adequately reinforces the plates against transverse and diagonal compressive forces. The plates are thus effectively reinforced against said compressive forces as may be applied in any or all directions.

Instead of bevelling the corners of the plate as at 13 (see Fig. 1), I may round the corners as at 13ª (Fig. 4) and accomplish the same results and advantages. This construction has a slight advantage in the pressing thereof, particularly as the plates are bent or pressed from cold steel blanks ranging in thickness up to three-sixteenths of an inch.

Where the extreme increased strength of the corner joints is not required and sufficient strength and rigidity of the assembled lining may be secured by bolting the flanges together as at 15. I provide against the seepage of material through the openings 14, by suitably attaching, as by welding, small triangular corner pieces 25 (see Figs. 6 and 7) presenting square corner edges for abutting engagement with similar corners of adjacent plates. These welded pieces, however, serve to reenforce the corner structure of the plates and of the assembled lining so that the structure is adequately strong for most installations.

Advantages of my invention reside in the increased strength of the tunnel liners as well as the assembled lining. The novel shape and arrangement of reinforcing ribs reinforces the plates against buckling from compressive forces applied longitudinally, transversely, as well as diagonally, and by clamping the corner sections, as above described, a tight strong assembled lining is provided and one which may be assembled in a minimum of time. Furthermore, by beveling or rounding the corners of the plates it is possible to make continuous side and end flanges of uniform width which may be pressed from cold blanks of plate steel, thus avoiding the necessity of heating the blanks as is required when upsetting and displacement of the metal is effected.

Having described several preferred embodiments of my invention, what I claim as new is:

1. A tunnel lining comprising a series of metal liner plates, each having a skin portion and upstanding continuous side and end flanges of uniform thickness, and being relieved at the corners providing openings between the corners of juxtaposed plates, connecting means extending through adjoining flanges of adjacent plates, and clamping means for clamping the corners of the plates together in strong assembled relation to support and withstand a load from above, said clamping means including means adapted to overlie said openings to prevent seepage of material therethrough.

2. A tunnel lining comprising a plurality of metal liner plates assembled together in staggered relation to form an arcuate lining, each having a skin portion and upstanding continuous side and end flanges of uniform thickness and rounded at the corners providing openings between the corners of juxtaposed plates, connecting means adjoining flanges of adjacent plates, and clamping means for clamping the corners of the plates together in strong assembled relation to support and withstand a load from the exterior, said clamping means including means adapted to cover said opening to prevent seepage of material therethrough.

3. A tunnel lining comprising a staggered assemblage of pressed metal liner plates, each having a skin portion and continuous upstanding side and end flanges substantially of uniform thickness the corners of said flanges at their juncture being relieved providing openings between adjoining plates, connecting means extending through adjoining flanges of adjacent plates to hold said plates together in assembled relation, closure plates for said openings, and means cooperating with the closure and liner plates including a member passing through said openings for rigidly clamping said adjoining plates together to provide a strong assembled lining to support a load above it.

4. A tunnel lining comprising a staggered assemblage of pressed metal liner plates, each having a skin portion and continuous upstanding side and end flanges, the corners of said flanges at their juncture being relieved providing openings between adjacent plates, connecting means extending through adjoining flanges of adjacent plates to hold said plates together in assembled relation, a closure plate for said openings, and means for rigidly clamping said liner plate corners and closure plate together to provide a strong assembled lining.

5. A tunnel lining comprising a staggered assemblage of pressed metal liner plates, each having a skin portion and continuous upstanding side and end flanges substantially of uniform thickness, the corners of said flanges at their juncture being relieved, providing openings between adjacent plates, connecting means extending through adjacent flanges of adjoining plates to hold said plates together in assembled relation, and individual closure means for each of said openings cooperating with the liner plates for reinforcing the lining and prevent seepage of material through said openings.

6. A tunnel lining comprising a series of at least three substantially rectangular arcuate liner plates, each having upstanding side and end flanges, said plates being assembled together in staggered relation so that the adjoining ends of two longitudinally disposed plates are adjacent the side flange of a laterally juxtaposed plate, a connection between each two adjacent plates extending through adjoining flanges thereof, and additional means engaging a portion of said plates, the side flange of said laterally juxtaposed plate and the adjacent corners of the two longitudinally disposed plates for clamping said three plates together.

ARTHUR E. WILKOFF.